United States Patent [19]

Peterson, II

[11] 4,261,460

[45] Apr. 14, 1981

[54] BELT CONVEYOR WIRE ROPE SUPPORT SYSTEM FOR WIRE ROPE MOUNTED ROLLER IDLERS

[76] Inventor: William D. Peterson, II, 1996 E. 4675 South St., Salt Lake City, Utah 84117

[21] Appl. No.: 69,884

[22] Filed: Aug. 27, 1979

[51] Int. Cl.³ .............................................. B65G 39/10
[52] U.S. Cl. ...................................... 198/828; 52/149; 198/862
[58] Field of Search ............... 198/828, 823, 827, 830, 198/862, 806; 248/649, 650, 676; 52/31, 149, 296; 138/105–107

[56] References Cited

U.S. PATENT DOCUMENTS

| | | | |
|---|---|---|---|
| 282,039 | 7/1883 | Beckwith | 52/149 |
| 3,105,588 | 10/1963 | Long | 198/828 |
| 3,844,404 | 10/1974 | Emmenegger | 198/828 |
| 4,083,156 | 4/1978 | Tye | 52/149 X |

Primary Examiner—Robert B. Reeves
Assistant Examiner—Douglas D. Watts
Attorney, Agent, or Firm—Robert Finch

[57] ABSTRACT

An intermediate assembly for supporting parallel cables stretched between end frames in a conveyor. The assembly including rigid cross members maintaining the cables a fixed distance apart, first and second posts each connected at its top end to one of the cables and at its bottom end to an anchor, and a third post connected diagonally of the first two posts, all of the posts are adjustable in length and the connection of the first and second posts to the anchors is pivotal to enable movement of the posts transverse to the cables.

3 Claims, 3 Drawing Figures

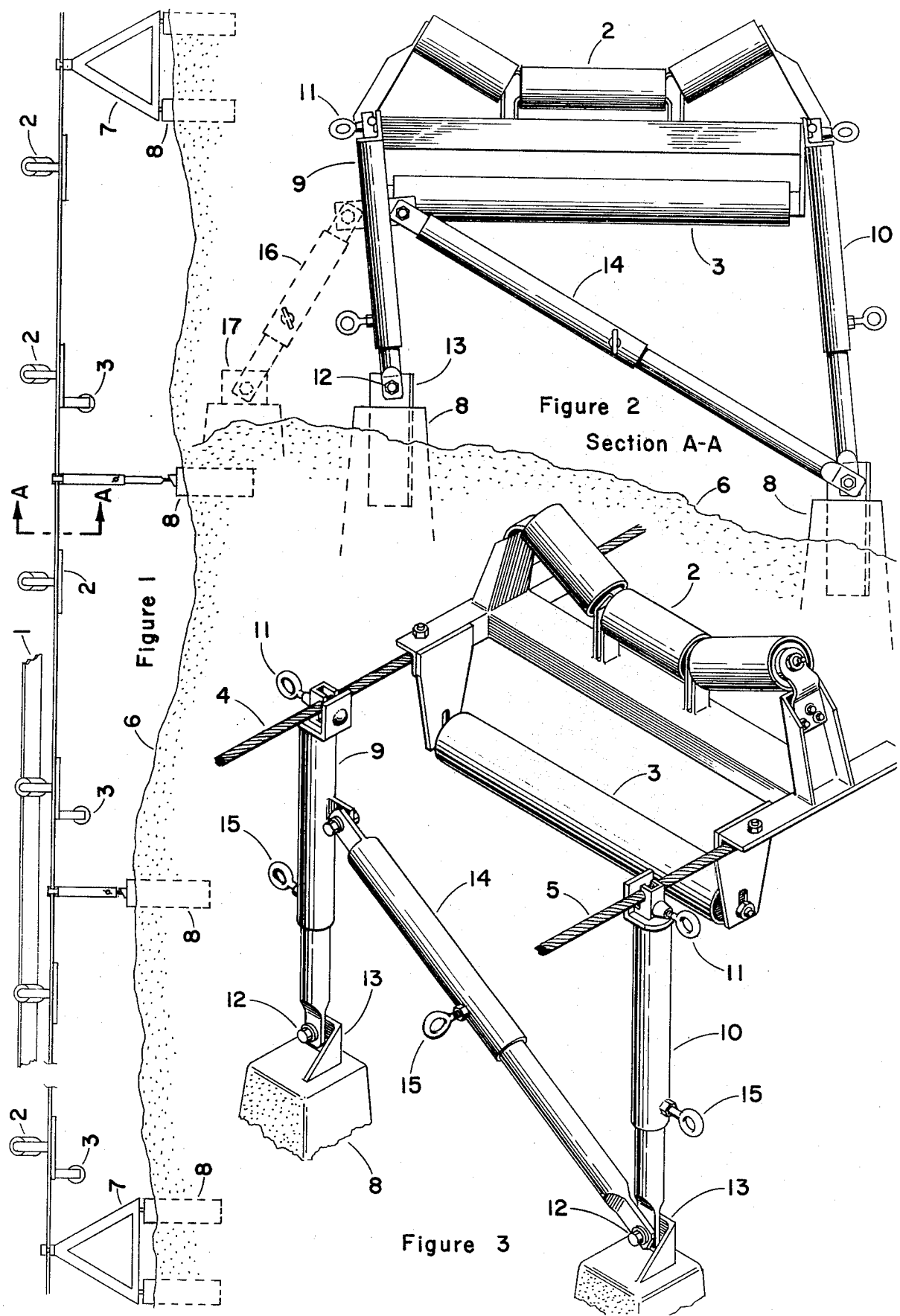

BELT CONVEYOR WIRE ROPE SUPPORT SYSTEM FOR WIRE ROPE MOUNTED ROLLER IDLERS

BRIEF SUMMARY OF THE INVENTION

Wire rope support stands conventionally shaped like an H with two parallel columns with a fixed horizontal attachment sit on floors or prepared flat surfaces such as a road bed. In some instances they are attached to railroad ties or concrete bases which in turn sit on a prepared flat ground surface. These set-ups used in some instances for years are considered by some people as temporary because the attachments to the ground are not permanent and the stands may drift. The object of this invention is for a permanent wire rope support system having good attachment to the ground. In addition, the support system being such that somewhat level ground need not be leveled for the conveyor and the ground need not be disturbed thus the contour of the ground need not be changed, and the conveying of material over plant life may be done with a minimum amount of trimming or removal of the natural foliage. Such a system is desirable to minimize the environmental impact which a conveyor system will have for the moving of coal and ores in areas of the United States where materials movement must be powered by coal or nuclear power electric plants to relieve the present method of petroleum powered vehicles.

The invented wire rope supports consist of independent singular adjustable vertical support columns which are attached at both ends, one end to the wire rope and the other end to the ground by means of a suitable anchor or other ground attachment. The columns are prevented from side swaying transverse to the cables by adjustable length diagonal braces, the bottom of which also attach to ground attachments.

The ground attachments are driven in or embedded or poured in place below ground surface structures which can secure a conveyor without settling or drifting. The securements would typically be made as sub-surface concrete cylinders poured in place in holes bored into the ground. An angle iron used as a reinforcement would be cast in and left protruding for connecting to a column and or a diagonal brace. The ground attachments should be of minimal area and may be at varying ground elevations which locations may also have broad tolerances in that the column need not be nearly vertical, or may thus lean substantially to miss particular foliage or rocks, etc. This system would thus be of minimal installation cost.

This invented support system divides a conveyor into sections. The typical lengths of these sections being from 500 to 1000 feet with wire rope support columns between, these being spaced at ten foot intervals and the carrying idlers at five foot intervals. These typical sections are ended by frames secured to the ground which hold the wire ropes in tension. The multiple series arrangement of sections approximately neutralizes the shear load at these securements. A typical maximum length for a fabric belt conveyor is 3500 feet, and over 15,000 feet for a steel cable reinforced belt.

BRIEF DESCRIPTION OF THE SEVERAL VIEWS OF THE DRAWING

FIG. 1 is a side elevational view of one section of an endless belt conveyor having secured frames at each end.

FIG. 2 is a cross sectional view of the conveyor showing a pair of vertical attachment columns and a diagonal brace. This view also shows a typical carrying and return idler which would be properly spaced beyond the supports.

FIG. 3 is a detailed, isometric view of typical wire rope, supports and idlers as shown in FIG. 2.

DETAILED DESCRIPTION

An overland belt conveyor system has a head discharge end which has a head pulley and is the end where power is normally applied to pull the conveying belt 1 which is made of a flexible material usually rubber. The conveyor has a tail loading end where the material being carried is loaded onto the belt 1. The head and tail are not shown in the drawings. Between the head and tail the carrying idlers 2 and return idlers 3 are supported by two parallel wire ropes 4,5 suspended above the ground 6. The wire ropes 4,5 are held in tension from the head to the tail. In a long conveyor system these wire ropes 4,5 are not one coninuous rope. Also for ease of installation, the wire rope pairs 4,5 are in a series of segments, each segment having wire rope 4,5 ends being attached to secured frames 7. These frames 7 would usually be steel structures firmly mounted to the ground 6 surface being attached to concrete footings 8. These frames 7 would be of a structured height to establish the proper height of the pairs of wire rope 4,5.

Between the secured frames 7 the wire ropes 4,5 are secured at properly spaced, regular intervals. Each rope 4,5 is held up by vertical adjustable length attachment columns 9,10. These columns are secured to the wire rope 4,5 by an attachment 11 and to the ground by another attachment 12 such as a bolt to a protruding reinforcement 13 cast in a concrete footing 8 in the ground 6. Other types of ground 6 securements 8, would include a buried post in the ground or a pile driven into the ground. These ground 6 securements or concrete footings 8 would normally be sub-surface, i.e. below the surface of the ground 6. The columns 9,10 holding up the wire ropes 4,5 are in pairs, each in the pair being opposite along the two parallel wire ropes 4,5. One of the pairs of the columns 9 holding up one of the wire ropes 4 is supported to prevent swaying by an adjustable length diagonal brace 14 secured near the top of the column 9 and extending in a normal direction from the wire rope 4 to a lower ground 6 attachment 12 near or to the bottom of the opposing mating column 10 which has the other wire rope 5 held up. With one wire rope 4 being held from swaying by the brace 14, the other wire rope 5 is prevented from swaying by its attachment to the first column 9 thru the horizontal connection of carrying idler 2 frame and return idler 3 which established the parallel relationship between the two wire ropes 4,5. This will necessitate that the upper part of the column 9,10 and the wire rope 4,5 be reasonably stiff, i.e. the wire rope 4,5 being in tension.

By adjusting the lengths of the upright columns 9,10 and the length of the elongated diagonal brace 14 correctly, the wire ropes 4,5 will be in their correct parallel positions. Note that wire ropes 4,5 have established positions which will probably not be directly above the ground attachment 12 location. In other words, the adjustable length attachment columns 9,10 will actually need be only approximately vertical. The adjustments in the rope 4,5 support members 9,10,14 shall have means of fixing 15 such as a clamping bolt which shall be secured after adjusting of the members 9,10,14 to their correct lengths. Before fixing all of the attachments 11, 12, the uprights and diagonals are capable of pivoting transversely to the wire ropes.

Having the adjustable length diagonal brace 14 between the pairs of columns 9,10 minimizes the number of concrete footings 8 to two per pair or one continuous footing. An alternate approach though not as desireable because the footings required become more, would be an external brace 16 attaching to an outboard securement 17.

I claim:

1. In a conveyor wherein a plurality of transverse idlers are carried by a pair of parallel spaced apart wire ropes suspended between two spaced apart fixed frames, the improved means for supporing said ropes and idlers intermediate said fixed frames comprising at least one support assembly which includes first and second posts each of which is connected adjacent its lower end to an anchor and adjacent its upper end to one of said ropes, a third post having one end connected adjacent the upper end of one of said first and second posts and extending downwardly at a diagonal with respect to said posts to connect at its other end to an anchor, rigid means extending transversely between and maintaining said ropes a fixed distance apart, all of said posts being adjustable in length and having means for locking at a selected length, and the connections of said first and second posts to said anchors being pivotal thereby enabling the upper ends of said posts to be moved transversely with respect to said ropes.

2. A support according to preceding claim 1 in which said third post extends diagonally between said first and second posts.

3. A support according to preceding claim 2 in which the lower end of said third post and the lower end of one of said first and second posts are connected to an anchor at a common point.

* * * * *